(12) United States Patent
Nalur

(10) Patent No.: US 6,210,739 B1
(45) Date of Patent: *Apr. 3, 2001

(54) OIL BLEND COMPOSITIONS

(75) Inventor: Shantha C. Nalur, New Milford, CT (US)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,319

(22) Filed: Jan. 19, 2000

Related U.S. Application Data

(60) Provisional application No. 60/118,101, filed on Feb. 2, 1999.

(51) Int. Cl.$^7$ .................................................. A23D 9/00

(52) U.S. Cl. .......................... 426/607; 426/601; 426/606; 426/631; 426/660

(58) Field of Search ................................... 426/607, 606, 426/601, 660, 631

(56) References Cited

U.S. PATENT DOCUMENTS

| | | | |
|---|---|---|---|
| 4,088,792 | * 5/1978 | Bracco | 426/250 |
| 4,208,445 | 6/1980 | Cottier et al. | 426/607 |
| 4,219,584 | 8/1980 | Mori et al. | 426/607 |
| 4,276,322 | 6/1981 | Padley et al. | 426/660 |
| 4,348,423 | 9/1982 | Pairaud et al. | 426/607 |
| 4,350,715 | * 9/1982 | Rek | 426/570 |
| 4,366,181 | 12/1982 | Dykshoorn | 426/603 |
| 4,430,350 | 2/1984 | Tresser | 426/101 |
| 4,465,703 | 8/1984 | Jasko et al. | 426/607 |
| 4,613,514 | 9/1986 | Maruzeni et al. | 426/607 |
| 4,705,692 | 11/1987 | Tanaka et al. | 426/607 |
| 4,711,788 | 12/1987 | Porcello et al. | 426/94 |
| 4,721,626 | 1/1988 | Rule | 426/601 |
| 4,873,109 | 10/1989 | Tanaka et al. | 426/607 |
| 4,902,527 | 2/1990 | Galenkamp et al. | 426/607 |
| 5,149,557 | 9/1992 | Morrison et al. | 426/570 |
| 5,324,533 | 6/1994 | Cain et al. | 426/607 |
| 5,431,948 | 7/1995 | Cain et al. | 426/607 |
| 5,439,700 | * 8/1995 | Cain et al. | 426/607 |
| 5,554,408 | 9/1996 | Cain et al. | 426/607 |
| 5,932,275 | 8/1999 | Nalur | 426/607 |

OTHER PUBLICATIONS

Lessner et. al., Cocoa Butter Alternatives Karlshamns Oils & Fats AB (1991).

Minifie, "Cocoa Butter and Replacement Fats," *Chocolate, Cocoa and Confectionery*, pp. 67–88 (1980).

Swern, *Bailey'Industrial Oil and Fat Products*, vol. 1, 4th Ed., pp. 317–322 (1979).

Berger, "Palm Oil Products: Why and How to Use Them," *Food Technology*, pp. 72–79 (Sep., 1986).

Dallow, "The Title of This Paper Is the Question: Chocolate or Compound Coating?" *The Manufacturing Confectioner*, pp. 26–38 (Feb., 1974).

Faulkner, "Cocoa Butter Equivalents Are Truly Specialty Vegetable Fats, " *The Manufacturing Confectioner*, pp. 56–61 (May, 1981).

McDonald et al., "Confectionery Fats—The Alternative Approach," *Confectionery Manufacture & Marketing*, pp. 5–6 (Apr., 1982).

Ransom et al., "Mixed Fat Interactions In Palm Kernel Oil Based Coatings," abstract in *IFT Annual Meeting/Book of Abstracts*, p. 224 (1995).

Sessa, "Derivation of Cocoa Butter Equivalent from Jojoba Transesterified Ester via a Differntial Scanning Calorimetry Index," *J. Sci. Food Agric.*, 72, pp. 295–298 (1996).

Shukla, "Confectionery Fats," in *Developments in Oils and Fats*, pp. 67–94 (1995).

Traitler et al., "Palm Oil and Palm Kernel Oil in Food Products," *JAOCS*, 62(2), pp. 417–421 (1985).

Wilton et al., "Quick and Simple Method for Studying Crystallization Behavior of Fats," *JAOCS*, 40, pp. 707–711 (1963).

(no author) "Confectionery Fats—For Special Uses," *JAOCS*, 61(3), pp. 468–472 (1984).

(no author) "Chocolate–Flavoured Compounds for Confectionery Coatings," *ZFL*, 44(4), PP. 64–66 (1993).

* cited by examiner

*Primary Examiner*—Carolyn Paden
(74) *Attorney, Agent, or Firm*—Pennie & Edmonds LLP

(57) ABSTRACT

The present invention is directed to novel oil blends suitable for use in edible products. More specifically, the invention is directed to oil blends including palm kernel oil, hydrogenated palm kernel oil, palm kernel stearin and hydrogenated palm kernel stearin, and at least one seeding agent, optionally with hydrogenated palm kernel oil, hydrogenated coconut oil, coconut oil, palm kernel oil, or a mixture thereof. The oil blend compositions of the present invention have a flavor release and texture properties similar to those of cocoa butter. They are particularly useful as cocoa butter substitutes in edible food products such as confectionery products and chocolate alternative compositions. Also disclosed are edible food products, such as confectionery products and chocolate alternative compositions, made from these oil blends.

19 Claims, 2 Drawing Sheets

OIL BLEND COMPOSITIONS

Figure 1:
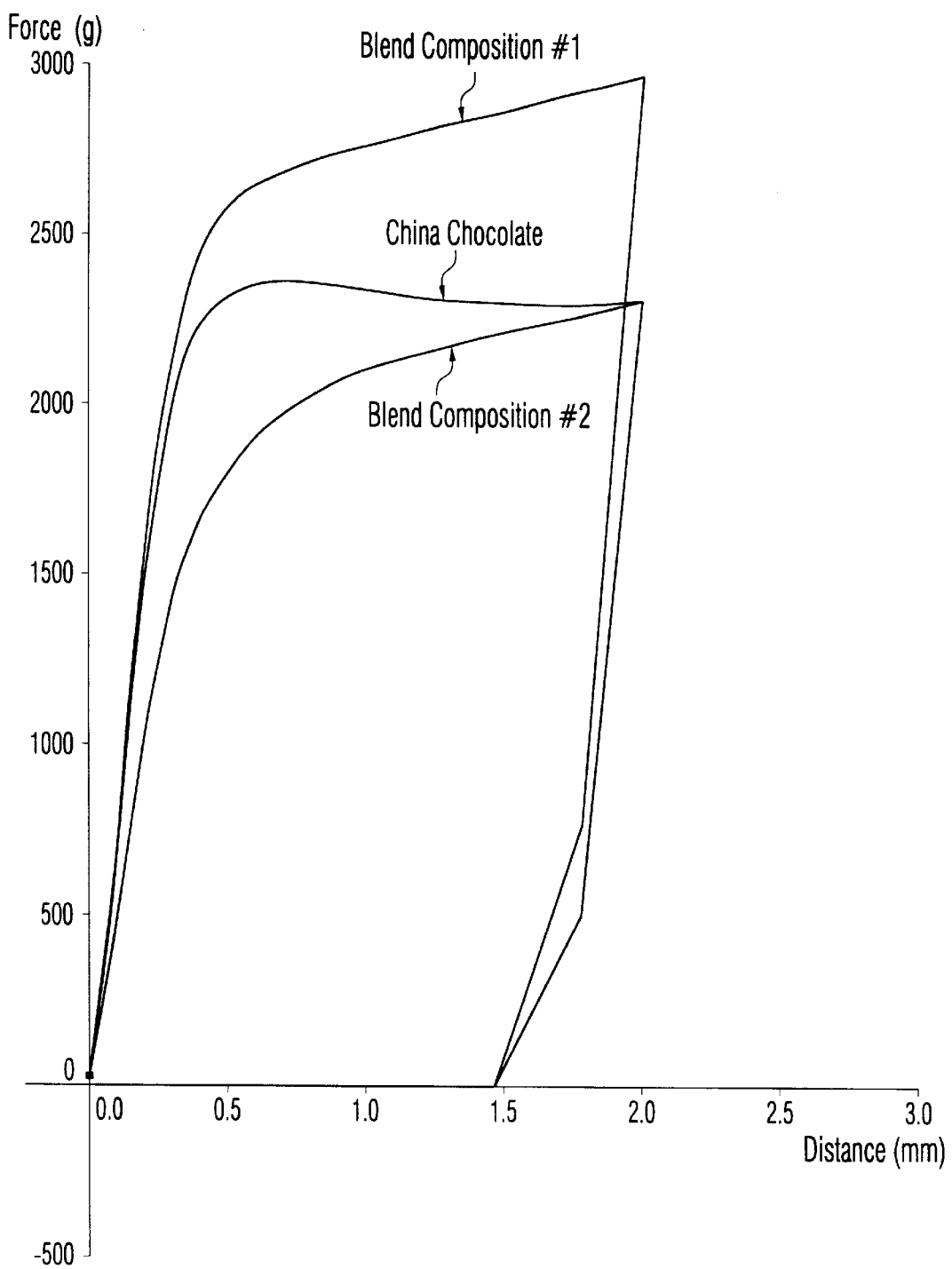

This application claims the benefit of provisional application Ser. No. 60/118,101 filed Feb. 2, 1999, the content of which is expressly incorporated by reference herein.

FIELD OF THE INVENTION

The present invention is directed to novel oil blends suitable for use in edible products. More specifically, the invention is directed to oil blends including palm kernel oil, hydrogenated palm kernel oil, palm kernel stearin, hydrogenated palm kernel stearin, coconut oil, hydrogenated coconut oil, coconut stearin, hydrogenated coconut stearin, hydrogenated coconut oil, and seeding agents. The oil blend compositions of the present invention have a flavor release and texture properties similar to those of cocoa butter. They are particularly useful as cocoa butter substitutes in edible food products such as confectionery products and chocolate alternative compositions.

BACKGROUND OF THE INVENTION

Cocoa butter is a widely used and much appreciated fat composition produced from cocoa beans. Cocoa butter is used for its flavor and texture properties in a variety of edible products, particularly in combination with sugars and other ingredients to make chocolate. The desirability of the characteristic cocoa butter flavor and texture have long assured a strong demand for cocoa butter and products which are made from cocoa butter. The worldwide cocoa bean supply, however, suffers from significant variability, due to constant and often unpredictable changes in the ability of different cocoa bean supplying regions to deliver enough beans at a consistent price and quality to meet the demand.

The uncertain availability of cocoa beans and the associated fluctuations in price have led to much effort to formulate alternative fat compositions which can be used in place of or in conjunction with natural cocoa butter. These alternative fats are generally classified into three types, based on their chemical composition and compatibility with cocoa butter. Cocoa butter equivalents (CBE) are fats which have chemical and physical properties compatible with cocoa butter, and can be used to supplement cocoa butter in confectionery products. Cocoa butter substitutes (CBS) are generally lauric fats which are incompatible with cocoa butter. Cocoa butter replacers (CBR) are partially compatible with cocoa butter. CBRs are primarily non-lauric fats which have properties intermediate those of CBEs and CBSs, and are sometimes referred to as non-lauric cocoa butter substitutes. Detailed discussions of these different types of alternative fats can be found in a variety of sources; see, for example, Traitler, H. et al., *Journal of the American Oil Chemists Society*, 62(2), 417–21 (1985); Shukla, V., in *Developments in Oils and Fats*, 66–94 (1995); Berger, K., Food Technology, 40(9), 72–79 (1986). Among these three principal types of alternative fats, cocoa butter equivalents are relatively more expensive, while cocoa butter substitutes are relatively less expensive. Typically, cocoa butter substitutes cost only one-third to one-fourth as much as cocoa butter, making products which use these alternative fats economically especially attractive to consumers.

One particular area in which cocoa butter substitutes are widely used is in compound coatings for confectionery products. In fact, most of the compound coatings now used in commercial confectionery are made of these cocoa butter substitutes. Cocoa butter substitutes are often characterized as "lauric" or "non-lauric", depending on the chemical nature of the component fats. Most lauric cocoa butter substitutes are based on palm kernel oils. Oil industry suppliers subject palm kernel oils to several processing and modifying steps, such as fractionation, hydrogenation and interesterification, and these fractions and derivatives are further blended together in various proportions to produce cocoa butter substitutes with different properties. Examples of commercial suppliers of these fats are Fuji Vegetable Oil Inc., Aarhus Inc., and Loders and Crocklaan. These various fats show differences in flavor, texture, bloom stability and processing characteristics.

Cocoa butter is particularly desirable in part because of its unusual melting characteristics. Cocoa butter is a solid at temperatures close to room temperature, but rapidly melts at body temperatures. Thus, unlike most oils or fats, cocoa butter maintains its solid shape at room temperature, around 20° C., but quickly melts as it is warmed in the mouth to temperatures above 30° C. As a result, cocoa butter has a unique and desirable texture and feel in the mouth, which contribute to its wide demand.

Recognizing that the melting characteristics of cocoa butter are desirable, much work has been done to mimic these melting characteristics in substitute fat compositions. Thus, oils can be chemically modified, such as by hydrogenation or interesterification, to modify their melting characteristics and hence increase their similarity to cocoa butter.

For example, U.S. Pat. No. 4,902,527 to Galenkamp et al. describes lauric fats which are selectively hydrogenated to provide a trans acid content of at least 25%. These modified fats reportedly show melting and other characteristics resembling those of coconut stearin, a high quality cocoa butter substitute.

Alternatively, oils can be chemically modified so that their triglyceride composition more closely matches that of cocoa butter. Cocoa butter is composed largely of 1,3-disaturated-2-unsaturated triglycerides. Thus, a number of U.S. patents disclose attempts to provide cocoa butter substitutes by controlling the triglyceride composition of the component fats. For example, U.S. Pat. No. 4,873,109 to Tanaka et al. discloses cocoa butter substitute compositions containing at least 80% 1,3-disaturated-2-oleoyl glycerols which are up to 10% 1,3-dipalmitoyl-2-oleoyl glycerol, 25–45% 1-palmitoyl-2-oleoyl-3-stearoyl glycerol, and 45–70% 1,3-distearoyl-2-oleoyl glycerol.

Other workers have tried to provide cocoa butter substitutes by blending different oils to produce an oil composition with the desired properties. U.S. Pat. No. 4,430,350 to Tressler describes coatings for frozen confections containing an oil blend which can include palm kernel oil. The oil blend contains an interesterified mixture of 75–90% lauric acid or oil (including palm kernel oil) and 10–25% non-lauric oil. Coatings made with these oil blends reportedly show good brittleness, flavor and mouthfeel properties.

U.S. Pat. No. 4,613,514 to Maruzeni et al. discloses a cocoa butter substitute composition obtained by removing as completely as possible the high melting point fraction of a palm oil. The composition thus contains a medium melting point palm oil fraction which, because of the lack of a high melting point component, shows very sharp melting characteristics.

U.S. Pat. No. 5,932,275 to Nalur discloses an oil blend of palm kernel oil, hydrogenated palm kernel oil, palm kernel stearin and hydrogenated palm kernel stearin as a cocoa butter substitute.

Despite these developments, there still remains a need for additional cocoa butter substitutes that are well-characterized, and possess the flavor and texture release properties of cocoa butter. The present invention now provides such products.

SUMMARY OF THE INVENTION

The present invention is directed to edible oil blends which have flavor release and texture properties similar to those of cocoa butter, despite being significantly different from cocoa butter in solid fat content and melting characteristics.

The oil blends of the invention include mixtures of palm kernel stearin, coconut stearin or a mixture thereof; hydrogenated palm kernel stearin, coconut stearin or a mixture thereof; and at least one seeding agent, optionally with other vegetable oils or hydrogenated derivatives thereof. A preferred oil blend in accordance with the invention includes between about 15 to about 85% by weight of palm kernel stearin, coconut stearin or a mixture thereof; between about 15 to about 85% by weight of hydrogenated palm kernel stearin, hydrogenated coconut stearin or a mixture thereof; and between about 0.1 to about 5% by weight of seeding agent. Additional preferred components of these blends, when present, include between about 2 to about 25% by weight of palm kernel oil, coconut oil or a mixture thereof and between about 2 to about 25% by weight of hydrogenated palm kernel oil, hydrogenated coconut oil or a mixture thereof.

Another aspect of the invention relates to edible food products which include these blends. The edible food product may be, for example, a confectionery center, a confectionery coating, an ice cream coating, a bar, a morsel or a creamer.

In still another aspect of the invention, a chocolate alternative composition including the oil blends of the invention is provided. In this aspect, a chocolate alternative composition of the invention may also include cocoa powder, milk powder, sugars, emulsifiers, and other components suitable for use in chocolate alternative compositions.

The oil blends of the invention, as well as the edible food products and chocolate alternative compositions containing these blends, provide a reliable source of appropriate confectionery fats that does not suffer from the variability in availability and in price associated with cocoa beans. Further and surprisingly, these oil blends offer alternatives to cocoa butter which possess highly desirable flavor and texture release properties similar to cocoa butter, despite differing from cocoa butter in solid fat content and melting characteristics.

BRIEF DESCRIPTION OF THE DRAWING FIGURES

Figure 2:
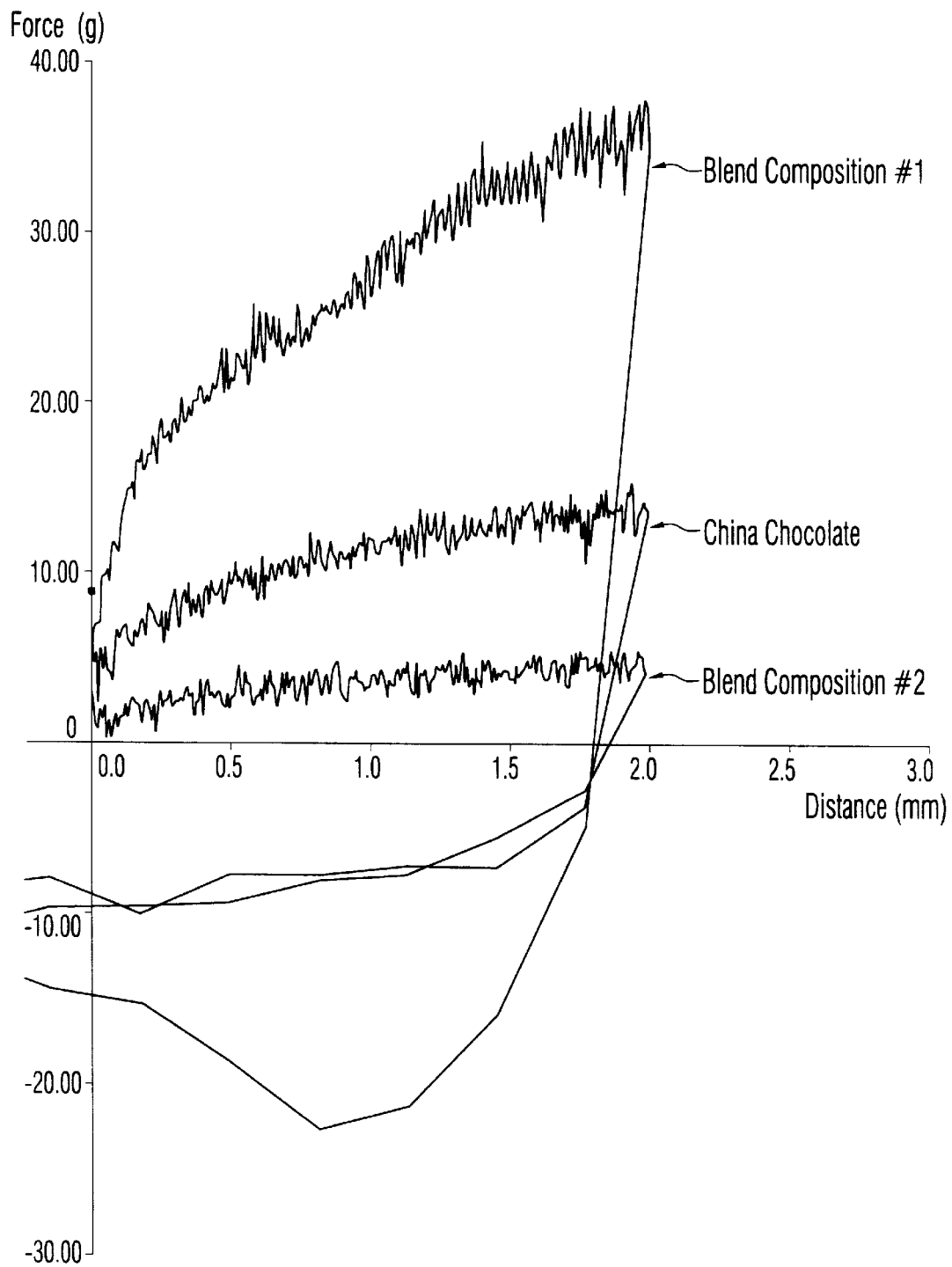

Other aspects of the invention will become readily apparent to those skilled in the art from the following detailed description which is reviewed in combination with the appended drawing figures, wherein:

FIG. 1 shows the texture results at 20° C. of the Blend Composition #1, Blend Composition #2, and China Chocolate; and FIG. 2 shows the texture results at 32° C. of the Blend Composition #1, Blend Composition #2, and China Chocolate.

DETAILED DESCRIPTION OF THE INVENTION

In one embodiment, the present invention relates to oil blends having flavor release and texture properties which are similar to those of cocoa butter. In particular, these oil blends include palm kernel stearin, coconut stearin or a mixture thereof; hydrogenated palm kernel stearin, hydrogenated coconut stearin or a mixture thereof; and at least one seeding agent, optionally with a vegetable oil or hydrogenated derivative thereof. It has been surprisingly found that oil blends including these components in particular weight percentages provide fat compositions having highly desirable flavor and texture properties similar to cocoa butter. Furthermore, these oil blends provide fat compositions having greater hardness than traditional oil blends.

The oil blends of the present invention preferably include between about 15 to about 85% by weight of palm kernel stearin, coconut stearin or a mixture thereof; between about 15 to about 85% by weight of hydrogenated palm kernel stearin, hydrogenated coconut stearin or a mixture thereof; and between about 0.1 to about 5% by weight of at least one seeding agent. The useful seeding agents are highly hydrogenated oils and include, but are not limited to, hardened coconut oil, hardened Babassu oil, hardened butter oil, hardened canola oil, hardened cocoa butter, hardened cottonseed oil, hardened illipe oil, lard, hardened menhaden oil, hardened olive oil, hardened palm oil and fractions thereof, hardened palm kernel oil, hardened peanut oil, hardened rapeseed oil, hardened safflower oil, hardened sal oil, hardened shea oil, hardened soybean oil, hardened sunflower oil, hardened tallow oil and a mixture thereof. Preferably, the seeding agent is hardened palm oil, hardened cottonseed oil, or a mixture thereof.

The optional components of the oil blends, when present, preferably include vegetable oils or hydrogenated derivatives thereof. Preferred components include between about 2 to about 25% by weight of palm kernel oil, coconut oil or a mixture thereof and between about 2 to about 25% by weight of hydrogenated palm kernel oil, hydrogenated coconut oil or a mixture thereof. These oil components individually are well known and are commercially available from various sources, such as Fuji Vegetable Oil Inc., Aarhus Inc., and Loders and Crocklaan.

The various oil components of the oil blends are miscible. Thus, an oil blend of the present invention can be produced by simple mixing of the components in the proper weight ratios. Preferably, in order to more easily obtain a homogeneous blend, the components are melted and stirred or mixed together.

In a preferred embodiment, an oil blend of the present invention includes between about 20 to about 45% by weight of palm kernel stearin, coconut stearin or a mixture thereof; between about 55 to about 80% by weight of hydrogenated palm kernel stearin, hydrogenated coconut stearin or a mixture thereof; and between about 0.5 to about 3% by weight of at least one seeding agent. More preferably, the oil blend includes between about 22 to about 35% by weight of palm kernel stearin, coconut stearin or a mixture thereof, between about 62 to about 78% by weight of hydrogenated palm kernel stearin, hydrogenated coconut stearin or a mixture thereof; and between about 1 to about 3% by weight of at least one seeding agent.

In another preferred embodiment, an oil blend of the present invention includes between about 40 to about 70% by weight of palm kernel stearin, coconut stearin or a mixture thereof; between about 15 to about 35% by weight of hydrogenated palm kernel stearin, hydrogenated coconut stearin or a mixture thereof; between about 0.5 to about 3% by weight of at least one seeding agent; between about 5 to about 20% by weight of palm kernel oil, coconut oil or a mixture thereof; and between about 3 to about 15% by weight of hydrogenated palm kernel oil, hydrogenated coconut oil or a mixture thereof. More preferably, the oil blend includes between about 50 to about 60% by weight of palm kernel stearin, coconut stearin or a mixture thereof; between about 18 to about 30% by weight of hydrogenated palm kernel stearin, hydrogenated coconut stearin or a mixture thereof; between about 0.5 to about 3% by weight of at least one seeding agent; between about 7 to about 17% by weight of palm kernel oil, coconut oil or a mixture thereof; and between about 5 to about 10% by weight of hydrogenated palm kernel oil, hydrogenated coconut oil or a mixture thereof.

The oil blends of the present invention possess highly desirable texture, flavor, and hardness properties. Thus, in another embodiment, the invention relates to edible food products which include these oil blends. The edible food products that include the oil blends are not particularly limited. The food product may be used, for example, in any foodstuff where cocoa butter is used as a replacement therefor. Typical foodstuffs include confectioneries such as a confectionery center, a confectionery coating, an ice cream coating, a bar, a morsel, a creamer and the like.

In one embodiment, the food product contains an oil blend, the oil blend including by weight: between about 15 to about 85%, preferably between about 20 to about 45%, more preferably between about 22 to about 35% of palm kernel stearin, coconut stearin or a mixture thereof; between about 15 to about 85%, preferably between about 55 to about 80%, more preferably between about 62 to about 78% of hydrogenated palm kernel stearin, hydrogenated coconut stearin or a mixture thereof; and between about 0.1 to about 5%, preferably between about 0.5 to about 3% of at least one seeding agent.

In another embodiment, the food product contains an oil blend, the oil blend including by weight: between about 15 to about 85%, preferably between about 40 to about 70%, more preferably between about 50 to about 60% of palm kernel stearin, coconut stearin or a mixture thereof; between about 15 to about 85% by weight, preferably between about 15 to about 35%, more preferably between about 18 to about 30% of hydrogenated palm kernel stearin, hydrogenated coconut stearin or a mixture thereof; between about 0.1 to about 5%, preferably between about 0.5 to 3% of at least one seed agent; between about 2 to about 25%, preferably between about 5 to about 20, more preferably about 7 to 17% of palm kernel oil, coconut oil or a mixture thereof; and between about 2 to about 25%, preferably between about 3 to 15%, more preferably between about 5 to 10% of hydrogenated palm kernel oil, hydrogenated coconut oil or a mixture thereof.

In still another embodiment, the present invention is directed to a chocolate alternative composition containing the oil blends of the present invention. The chocolate alternative compositions of the present invention include between about 24 to about 33% and preferably between about 25 to about 30% by weight of a fat component, in the form of the oil blends of the invention. The oil blend can be any of the oil blends described herein. Other components which are preferably contained in the chocolate alternative composition are those which are well known to those of ordinary skill in the art. These additional components include, for example, cocoa powder, various sugars or sugar substitutes, milk powder, emulsifiers, and other components known to one of skill in the art, such as stabilizers, preservatives, flavoring and coloring agents, and the like.

One preferred chocolate alternative composition of the present invention includes, by weight: about 24 to about 33%, preferably about 25 to about 30%, of the oil blends described above; about 30 to about 60% sugars; about 2 to about 25% cocoa powder; about 1 to about 20% milk solids; and optionally up to about 0.5% of an emulsifier. Other preferred examples of chocolate alternative compositions according to the invention are given in the Examples.

Within these approximate ranges, preferred amounts and specifically preferred components vary with the nature of the chocolate alternative desired, and are readily determined by one skilled in the art. For example, the specific sugars chosen, and the amount of sugar used, are readily determined by the desired taste and texture of the product. For typical compound coating applications, a preferred sugar is sucrose. The cocoa powder should have less than about 15%, and preferably no more than about 10 or 12%, fat content. At higher fat amounts, the ingredient mixture may undesirably soften. Similarly, the milk powder can be non-fat milk powder, full-fat milk powder, or anything in between, depending on the taste and texture desired. The emulsifier can be any emulsifier suitable for use in food products, and these are well known to those of ordinary skill in the art. For example, typical emulsifiers suitable for use in the chocolate alternative compositions of the present invention include lecithin, polyglycerol polyricineolate (PGPR), sorbitan monostearate (SMS), polysorbate 60, sorbitan tristearate (STS), lactic acid esters (LAE), distilled monoglycerides (DMG), mono-diglyceride (MDG), diacetyl tartaric acid esters of mono-diglycerides (DATEM), and commercially-available emulsifier blends, such as BETTRFLOW™, a blend of monosodium phosphate derivatives of mono- and diglycerides. Mixtures of these emulsifiers are suitable as well. A preferred emulsifier is lecithin. Various other ingredients and additives well known to one skilled in the art can also be added, as desired.

Thus, the invention described herein encompasses oil blends, edible food products containing the oil blends, and chocolate alternative compositions made therefrom. The oil blends of the present invention, and the products made from them, provide a desired hardness and highly desirable flavor and texture release properties similar to those of cocoa butter.

EXAMPLES

The invention is further defined by reference to the following examples describing in detail certain embodiments and features of the present invention, as well as their utility. The examples are representative and should not be construed to limit the scope of the invention.

Example 1

Blend Composition #1

The following oil blend was prepared:

Palm Kernel Stearin—28.5% by weight

Hydrogenated Palm Kernel Stearin—70% by weight

Hardened Palm Oil—1.5% by weight

Each component was separately heated until completely melted, added into a mixing vessel, and stirred until the mixture was homogeneous. The resulting oil blend was then ready to be added to various food products.

Example 2

Blend Composition #2

The following oil blend was prepared:

Palm Kernel Stearin—55.8% by weight

Hydrogenated Palm Kernel Stearin—23.3% by weight

Hardened Palm Oil—1.5% by weight

Palm Kernel Oil—11.6% by weight

Hydrogenated Palm Kernel Oil—7.8% by weight

Each component was separately heated until completely melted, added into a mixing vessel, and stirred until the mixture was homogeneous. The resulting oil blend was then ready to be added to food products.

Example 3

Chocolate Alternative Made with Blend Composition #1

A chocolate alternative was made using 28.5% by weight of Palm Kernel Stearin, 70% by weight of Hydrogenated Palm Kernel Stearin, and 1.5% by weight of Hardened Palm Oil. The composition of the chocolate alternative was as follows (% by weight):

| | |
|---|---|
| Sucrose | 49.8 |
| Non-Fat Dry Milk | 14.6 |
| Cocoa (10–12% fat) | 5.1 |
| Blend Composition #1 | 30.3 |
| Lecithin | 0.2 |

Example 4

Chocolate Alternative Made with Blend Composition #2

A chocolate alternative was made using 55.8% by weight of Palm Kernel Stearin, 23.3% by weight of Hydrogenated Palm Kernel Stearin, 1.5% by weight of 20 Hardened Palm Oil, 11.6% by weight of Palm Kernel Oil, and 7.9% by weight of Hydrogenated Palm Kernel Oil. The composition of the chocolate alternative was as follows (% by weight):

| | |
|---|---|
| Sucrose | 49.8 |
| Non-Fat Dry Milk | 14.6 |
| Cocoa (10–12% fat) | 5.1 |
| Blend Composition #2 | 30.3 |
| Lecithin | 0.2 |

Example 5

Chocolate Alternative Made with Blend Composition #1

A chocolate alternative was made 28.5% by weight of Palm Kernel Stearin, 70% by weight of Hydrogenated Palm Kernel Stearin, and 1.5% by weight of Hardened Palm Oil. The composition of the chocolate alternative was as follows (% by weight):

| | |
|---|---|
| Sucrose | 53.5 |
| Cocoa (0% fat) | 17.7 |
| Blend Composition #1 | 28.7 |
| Lecithin | 0.1 |

Example 6

Chocolate Alternative Made with Blend Composition #2

A chocolate alternative was made using 55.8% by weight of Palm Kernel Stearin, 23.3% by weight of Hydrogenated Palm Kernel Stearin, 1.5% by weight of Hardened Palm Oil, 11.6% by weight of Palm Kernel Oil, and 7.9% by weight of Hydrogenated Palm Kernel Oil. The composition of the chocolate alternative was as follows (% by weight):

| | |
|---|---|
| Sucrose | 53.5 |
| Cocoa (0% fat) | 17.7 |
| Blend Composition #2 | 28.7 |
| Lecithin | 0.1 |

Example 7

Texture Measurement of Chocolate Alternative Made with Blend Composition #1 and Blend Composition #2

In this Example, texture measurements were made for the chocolate alternatives made using the chocolate alternative described in Example 3 having (by weight percent) 49.8% sucrose, 14.6% non-fat dry milk, 5.1% cocoa (10–12% fat), 30.0% Blend Composition #1, as described in Example 1, and 0.2% lecithin; and the chocolate alternative described in Example 4 having (by weight percent) 49.8% sucrose, 14.6% non-fat dry milk, 5.1% cocoa (10–12% fat), 30.0% Blend Composition #2, as described in Example 2, and 0.2% lecithin. The measurements were made with a TA-XT2 texture analyzer (Texture Technologies Corp., New York) equipped with XTRAD software.

The texture of the Blend Composition-based chocolate alternatives was compared to the texture of a representative chocolate, China Chocolate (Nestle). Each sample was formed into pieces of dimension 37×19×6 mm by melting the sample and cooling it in a mold. These pieces were then supported on a hollow testing surface. A 2 mm diameter punch probe (TA-52) was used for the test. A pre-test speed of 5 mm/s, followed by a test speed of 1 mm/s was used. The probe penetrated to a depth of 5 mm, with a force threshold of 0.05 N, and returned to its original position at a rate of 10 mm/s.

The hardness of the coatings were studied at 20° C., 32° C., and 35° C., and the methods are shown in Table 1 below.

TABLE 1

TA-XT2 Method For Analysis of Coating Hardness.

| TA Setting | Test Method at 20° C. | Test Method at 32° C. and 35° C. |
|---|---|---|
| Pre-test Speed | 3 mm/sec | 3 mm/sec |
| Test Speed | 1.0 mm/sec | 0.1 mm/sec |
| Post-test Speed | 4 mm/sec | 4 mm/sec |
| Depth | 2 mm | 2 mm |
| Trigger Force | 10 g | 6 g |
| Probe | TA-52 punch probe | TA-55 punch probe |
| Attribute analyzed | Maximum Force | Maximum Force | a) Texture Results at 20° C.

FIG. 1 and Table 2 show the texture results at 20° C. of the Blend Composition #1, Blend Composition #2, and China Chocolate. Each data curve in FIG. 1 is an average of four measurements (CV<10%). The point of inflection on the graph and the maximum force indicates the hardness of the coating/chocolate. The Blend Composition #1 is much harder than the China Chocolate or the Blend Composition #2 at 20° C.

TABLE 2

Texture Results of Blend Composition #1, Blend Composition #2, and China Chocolate at 20° C.

| Sample | Hardness (force in g) |
| --- | --- |
| China Chocolate | 2370 |
| Blend Composition #1 | 2965 |
| Blend Composition #2 | 2314 | b) Texture Results at 32° C. and 35° C.

FIG. 2 and Table 3 show the texture results at 32° C. of the Blend Composition #1, Blend Composition #2, and China Chocolate. Each data curve in FIG. 2 is an average of four measurements (CV<10%). The point of inflection on the graph and the maximum force indicates the hardness of the coating/chocolate. The shape retention property of Blend Composition #1 (maximum force=39g) is much higher compared to the China Chocolate (maximum force=1 6.2g) or the Blend Composition #2 (maximum force 6.4g).

At 35° C., each of the samples melted.

TABLE 3

Texture Results of Blend Composition #1, Blend Composition #2, and China Chocolate at 32° C.

| Sample | Hardness (force in g) |
| --- | --- |
| China Chocolate | 16.2 |
| Blend Composition #1 | 39.0 |
| Blend Composition #2 | 6.4 |

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those of ordinary skilled in the art from the foregoing description. Such modifications are also intended to fall within the scope of the appended claims.

What is claimed is:

1. An oil blend comprising between about 15 to about 85% by weight of palm kernel stearin, coconut stearin or a mixture thereof; between about 15 to about 85% by weight of hydrogenated palm kernel stearin, hydrogenated coconut stearin or a mixture thereof; and between about 0.1 to about 5% by weight of at least one seeding agent.

2. The oil blend of claim 1 which comprises between about 20 to about 45% by weight of palm kernel stearin, coconut stearin or a mixture thereof; between about 55 to about 80% by weight of hydrogenated palm kernel stearin, hydrogenated coconut stearin or a mixture thereof; and between about 0.5 to about 3% by weight of at least one seeding agent.

3. The oil blend of claim 2 which comprises between about 22 to about 35% by weight of palm kernel stearin, coconut stearin or a mixture thereof; between about 62 to about 78% by weight of hydrogenated palm kernel stearin, hydrogenated coconut stearin or a mixture thereof; and between about 1 to about 3% by weight of at least one seeding agent.

4. The oil blend of claim 1 which further comprises between about 2 to about 25% by weight of palm kernel oil, coconut oil or a mixture thereof.

5. The oil blend of claim 1 which further comprises between about 2 to about 25% by weight of hydrogenated palm kernel oil, hydrogenated coconut oil or a mixture thereof.

6. The oil blend of claim 5 which comprises between about 50 to about 60% by weight of palm kernel stearin, coconut stearin or a mixture thereof; between about 18 to about 30% by weight of hydrogenated palm kernel stearin, hydrogenated coconut stearin or a mixture thereof; between about 0.5 to about 3% by weight of at least one seeding agent, between about 7 to about 17% by weight palm kernel oil, coconut oil or a mixture thereof; and between about 5 to about 10% by weight of hydrogenated palm kernel oil, hydrogenated coconut oil or a mixture thereof.

7. The oil blend of claim 1 wherein the palm kernel stearin, coconut stearin or a mixture thereof is present in an amount of between about 40 to about 70% by weight, the hydrogenated palm kernel stearin, hydrogenated coconut stearin or a mixture thereof is present in an amount of between about 15 to about 35% by weight of, the at least one seeding agent is present in an amount of between about 0.5 to about 3% by weight, and the blend further comprises between about 5 to about 20% by weight palm kernel oil, coconut oil or a mixture thereof, and between about 3 to about 15% by weight of hydrogenated palm kernel oil, hydrogenated coconut oil or a mixture thereof.

8. The oil blend of claim 1 wherein the seeding agent is selected from the group consisting of hardened coconut oil, hardened Babassu oil, hardened butter oil, hardened canola oil, hardened cocoa butter, hardened cottonseed oil, hardened illipe oil, lard, hardened menhaden oil, hardened olive oil, hardened palm oil and fractions thereof, hardened palm kernel oil, hardened peanut oil, hardened rapeseed oil, hardened safflower oil, hardened sal oil, hardened shea oil, hardened soybean oil, hardened sunflower oil, hardened tallow oil and a mixture thereof.

9. The oil blend of claim 8 wherein in the seeding agent is hardened palm oil, hardened cottonseed oil, or a mixture thereof.

10. An edible food product which includes therein the oil blend of claim 1 in an amount effective as a cocoa butter substitute.

11. The edible food product of claim 10 which is a confectionery center, a confectionery coating, an ice cream coating, a bar, a morsel or a creamer.

12. A chocolate alternative composition comprising cocoa powder and the oil blend of claim 1.

13. The chocolate alternative composition of claim 12 wherein the oil blend is present in an amount of about 24 to about 33% by weight of the composition.

14. The chocolate alternative composition of claim 12 wherein the cocoa powder has a fat content of less than about 15%, and is present in an amount of about 2 to about 25% by weight of the composition.

15. The chocolate alternative composition of claim 12 further comprising a sugar in an amount of about 30 to about 60% by weight of the composition.

16. The chocolate alternative composition of claim 12 further comprising milk powder in an amount of about 1 to about 20% by weight of the composition.

17. The chocolate alternative composition of claim 12 further comprising an emulsifier in an amount of from about 0.01 to about 0.5% by weight of the composition.

18. An edible food product comprising the chocolate alternative composition of claim 12.

19. The edible food product of claim 18 in the form of a confectionery center, a confectionery coating, an ice cream coating, a bar, a morsel or a creamer.

* * * * *